S. WILTSE.
CONNECTING ROD FOR ENGINES.
APPLICATION FILED NOV. 20, 1920.
1,413,645. Patented Apr. 25, 1922.
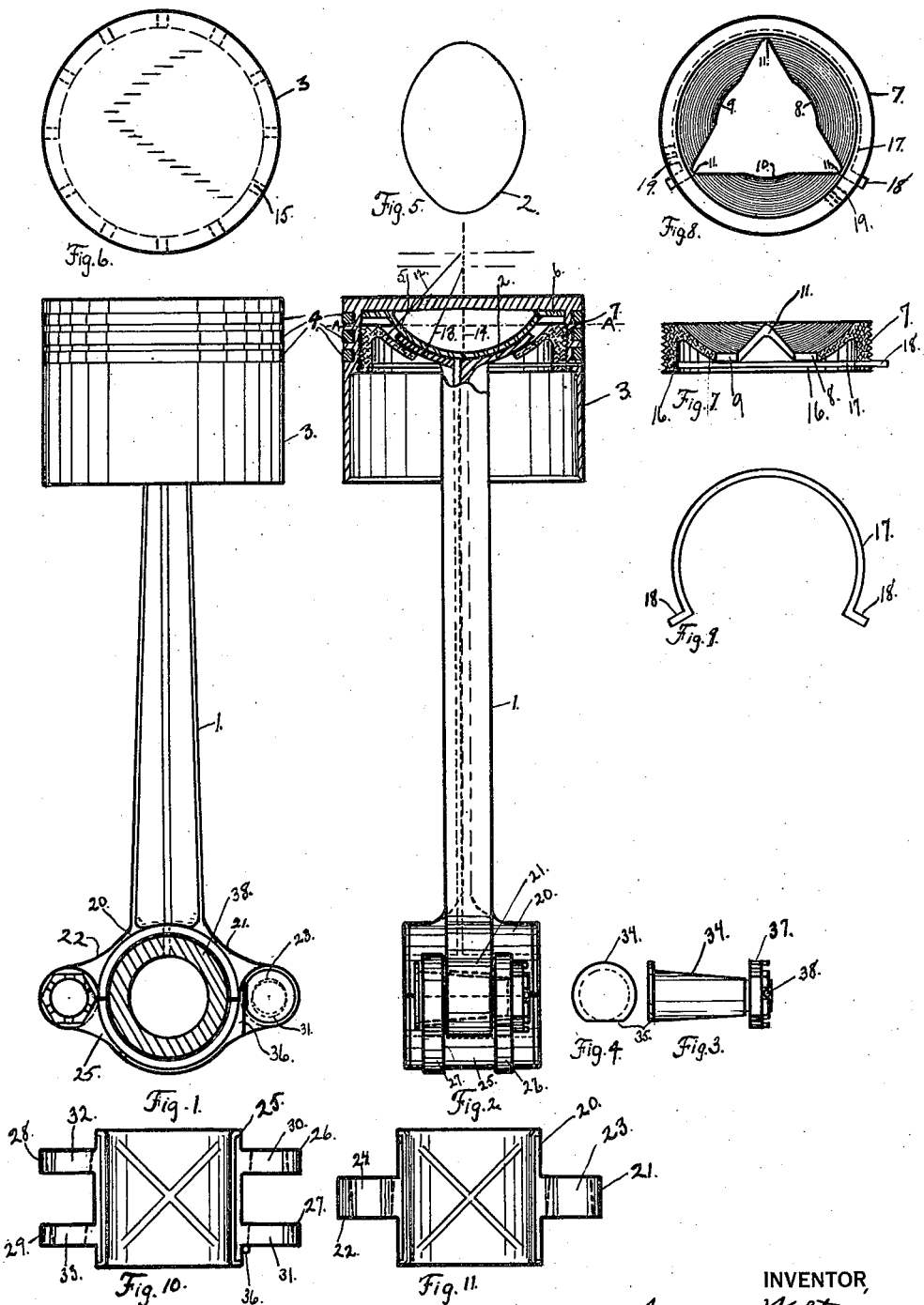
INVENTOR
Sumner Wiltse,
BY
Howard S. Smith
His ATTORNEY

UNITED STATES PATENT OFFICE.

SUMNER WILTSE, OF DAYTON, OHIO.

CONNECTING ROD FOR ENGINES.

1,413,645.  Specification of Letters Patent.  Patented Apr. 25, 1922.

Application filed November 20, 1920. Serial No. 425,335.

*To all whom it may concern:*

Be it known that I, SUMNER WILTSE, a citizen of the United States, residing at Dayton, in the county of Montgomery and State of Ohio, have invented certain new and useful Improvements in Connecting Rods for Engines, of which the following is a specification.

The principal object of my invention is to provide for engines, particularly those of the explosive type, a simple, readily-assembled, and self-alining connecting rod. This invention contemplates the provision of a self-adjusting crank-shaft, connecting-rod bearing as well as a self-adjusting bearing within the piston, for the head of the connecting rod.

Other important and incidental objects will be brought out in the following specification, and particularly set forth in the subjoined claims.

In the accompanying drawings, Figure 1 is a side elevational view of my improved connecting rod construction, with the crank shaft in section. Figure 2 is a side elevational view of my connecting rod construction, with the piston, and bearings therein, in section. Figure 3 is a side elevational view of the crank-shaft, connecting rod, bearing-cap bolt. Figure 4 is an end view thereof. Figure 5 is a top plan view of the head of the connecting rod. Figure 6 is a top plan view of the piston. Figure 7 is a cross section taken on the line A—A of Figure 2. Figure 8 is a top plan view of the retaining nut, showing the spring lock therefor in position. Figure 9 is a plan view of the spring lock for the retaining nut. Figure 10 is a top plan view of the lower section of the crank-shaft, connecting rod bearing-cap. And Figure 11 is a bottom plan view of the upper section of the crank-shaft, connecting rod-bearing cap.

Throughout the specification and drawings, similar reference characters denote corresponding parts.

Referring to the accompanying drawings, the numeral 1 designates a connecting rod that terminates at its upper end in an elliptical cup-shaped head 2. Referring to Figures 1 and 2, the numeral 3 designates a piston provided with the usual piston rings 4.

Pressed within the upper portion of the piston 3 is a cup-shaped bearing 5 preferably constructed of bronze. The bearing 5 has a flat annular rim 6 whose wide, flat top surface presses against the top of the piston and whose side periphery bears against the interior surface of the latter.

The upper interior surface of the piston 3, opposite the rings 4, is threaded to receive an annular retaining nut 7 preferably constructed of aluminum. Between the lower surface of the bearing 5 and the upper surface of the retaining nut 7, the cup shaped head 2 of the connecting rod has an oscillatory movement.

Referring to Figures 7 and 8, the retaining nut 7 is constructed as follows: It comprises a cylindrical casting having a top depressed portion that is machined out to form three bearing sections 8, 9 and 10. Each section is separated from the adjacent one by a triangular-shaped cut 11, which permits the elliptical shaped head 2 of the connecting rod to be slipped through the retaining nut 7 before the latter is screwed into the piston 3.

The radius 12 of the retaining nut 7 is greater than the radius 13 of the lower surface of the cup-shaped head 2 of the connecting rod, their different centers being on the dotted line 14 that represents the longitudinal axis of the piston 3. (See Figure 2.) When the retaining nut 7 is screwed into the piston 3, the outer marginal edges of the wing sections 8, 9 and 10 of said nut will engage the under surface of the cup-shaped head 2 of the connecting rod, to press it against the lower surface of the bearing 5. During this pressing movement of the wing sections of the nut 7, they are permitted to give or yield, since they have a greater radius than the lower surface of the cup-shaped head of the connecting rod. Therefore, they will form a self-adjusting bearing for the head of the connecting rod after the latter is in place within the piston. Since the bearing is self-adjusting, any inaccuracy in manufacture can be overcome by use. Furthermore, this type of bearing permits the piston to turn radially on the head of the connecting rod, thereby eliminating out-of-round and scored pistons and cylinder walls.

For the purpose of locking the retaining nut 7 in its proper position within the piston 3, the following means are provided. Referring to Figure 6, a number of radial holes 15, equally spaced apart, are provided in the wall of the piston 3 below the rings 4. Set in an annular groove 16 within the inner wall of the retaining nut 7, is a C-shaped spring 17 terminating at its ends in outwardly projecting prongs 18. Each of these prongs is adapted to project through one of a series of holes 19 provided in the wall of the retaining nut 7. (See Figure 8.) When the retaining nut is in its proper position within the piston, there will always be two holes 19, 19 in the retaining nut, in registry with two of the holes 15 in the piston, to receive the prongs 18 of the spring 17, whereby the latter may firmly hold the retaining nut within the piston. It is simply a matter of mathematics to locate the holes so that two sets of them will always be in registry to receive the prongs 18 on the spring 17.

The connecting rod 1 terminates at its lower end in a top bearing cap 20. The latter has two outwardly projecting bosses 21 and 22, the former containing a hole 23 which is tapered in a direction opposite to that of a hole 24 provided in the boss 22. (See Figure 11.)

Referring to Figure 10, the numeral 25 designates the lower bearing cap which has two outwardly projecting bosses 26 and 27 on one side, and two outwardly projecting bosses 28 and 29 on the other side, said bosses being parallel with the axis of the bearing. The boss 26 contains a tapered hole 30 which is a continuation of a hole 31 provided in the boss 27. On the other side of the bearing cap, the boss 28 contains a tapered hole 32 which is a continuation of a hole 33 provided in the boss 29. The holes 30 and 31 are tapered in a direction opposite to that of the holes 32 and 33 in the bosses 28 and 29 respectively.

The bearing caps 20 and 25 are assembled by bringing the boss 21 between the bosses 26 and 27, and the boss 22 between the bosses 28 and 29. When the boss 21 is properly positioned between the bosses 26 and 27, the longitudinal axis of the holes 30 and 31 in the latter bosses will be below the longitudinal axis of the hole 23 in the boss 21. And when the boss 22 is properly positioned between the bosses 28 and 29, the longitudinal axis of the holes 32 and 33 in the latter bosses will be below the longitudinal axis of the hole 24 in the boss 22. (See dotted lines in Figures 1 and 2.) A tapered bearing cap bolt 34 is then inserted through the holes 23, 30 and 31 in the bosses on one side of the bearing, while a similar bearing cap bolt 34 is inserted through the holes 24, 32 and 33 in the bosses on the other side of the bearing. Now since the longitudinal axis of the hole 23 is slightly above the longitudinal axis of the holes 30 and 31, the inward movement of the bearing cap bolt 34 will engage the off-center surfaces of these holes to draw the bearing caps 20 and 25 tightly together. Likewise, the entrance of the bearing cap bolt 34 on the other side, into the holes 24, 32 and 33 will engage their off-center surfaces to draw the bearing caps 20 and 25 firmly together on the left hand side of the bearing.

Referring to Figures 1, 3 and 4, the head of the bearing cap bolt 34 is milled to provide a flat surface 35 which engages a shoulder 36 on each side of the lower bearing cap 25 to prevent said bolt from turning when it is tightened. On its outer end the bolt 34 receives a castellated nut 37 through which, and the bolt 34, a cotter pin 38 is forced.

The bearing just described is self-adjustable within reasonable limits on the crankshaft 38. This is due to the fact that when the bearing caps 20 and 25 are assembled, the respective bearing cap bosses are under a certain tension which tends to maintain said caps in bearing contact with the crank shaft during varying conditions of service.

It is thus seen that I have provided a simple and efficient connecting rod which is self-adjusting within all practical limits, in the top and bottom bearings.

Having described my invention, I claim:

1. In a device of the type described, the combination with a piston, of a cup-shaped bearing in its upper portion, a connecting rod, a cup-shaped head on the latter, a retaining nut within said piston, below said head, and resilient wing surfaces provided around a central opening in said nut, for the purpose specified.

2. In a device of the type described, the combination with a piston, of a cup-shaped bearing in its upper portion, a connecting rod, a cup-shaped head on the latter, a retaining nut within said piston, and a bearing surface on said nut for the cup-shaped head of the connecting rod, said surface having a different center than that of the cup-shaped head and radii that are greater than those of the cup-shaped head.

3. In a device of the type described, the combination with a piston, of a cup-shaped bearing in its upper portion, a connecting rod, a cup-shaped head on the latter, a retaining nut within the piston, below the cup-shaped head, said nut provided with an annular groove in its inner surface, a resilient element seated within said groove, and means on said element adapted to project through the wall of the retaining nut into engagement with the piston, for the purpose specified.

4. In a device of the type described, the combination with a piston, of a cup-shaped bearing in its upper portion, a connecting rod, a cup-shaped head on the latter, a retaining nut within the piston, below the cup-shaped head, said nut provided with an annular groove in its inner surface, a C-shaped spring seated within said groove, and a prong on each end of said spring projecting through one of a series of holes in said nut, into one of a series of holes in said piston, for the purpose specified.

5. In a device of the type described, the combination with a piston, a cup-shaped bearing in its upper portion, a connecting rod, an elliptical head on the latter, and a retaining nut in said piston, having the approximate shape of a triangle to permit the elliptical head of the connecting rod to be slipped through it, for the purpose specified.

In testimony whereof I have hereunto set my hand.

SUMNER WILTSE.

Witness:
   M. D. McDANIEL.